Patented May 1, 1945

2,374,915

UNITED STATES PATENT OFFICE 2,374,915

METHOD OF FORMING FATTY ACID SUBSTITUTED AMINO COMPOUNDS

Frederick C. Berswerth, Verona, N. J., assignor to The Martin Dennis Company, Newark, N. J., a corporation of New Jersey No Drawing. Application July 31, 1942, Serial No. 453,109

4 Claims. (Cl. 260—404.5)

This invention relates to chemistry and more particularly to organic chemistry and is a continuation-in-part of my prior filed application Serial No. 284,216 filed July 13, 1939, now issued as Patent No. 2,294,442 dated September 1, 1942.

The object of the invention is to provide a method of converting unsaturated fatty acids into substituted amino compounds by the direct substitution of an amine therein.

Another object is to provide a method of converting an unsaturated fatty acid amide into a substituted amino acid amide.

Still another object is to provide a method of producing high molecular weight substituted amino acid amides.

Other objects will be apparent as the invention is more fully hereinafter disclosed.

In accordance with these objects, I have discovered that the amide compounds of the unsaturated fatty acids may be converted into substituted amino acid amides by reacting the amide with an amine in the presence of a hydrogenating catalyst under conditions inhibiting oxidation and hydrolysis.

Under these conditions I have discovered that the amine reacts with the unsaturated fatty acid amide at the unsaturated center olefinic linkage forming high molecular weight amino acid amides of a type not heretofore known in the art, the particular structure depending upon the particular fatty acid and amine which is used.

As one specific embodiment of the present invention, but not as a limitation thereof, the reaction between oleic acid and ethylene diamine will be described.

Oleic acid $$(CH_3 \cdot (CH_2)_7 \cdot CH=CH \cdot (CH_2)_7 \cdot COOH)$$

is a well recognized example of an unsaturated fatty acid. This acid is hydrogenatable to stearic acid $(CH_3 \cdot (CH_2)_7 \cdot CH_2 \cdot CH_2 \cdot (CH_2)_7 \cdot COOH)$ by saturating the center olefinic linkage (CH=CH) with activated hydrogen. In accordance with the present invention the center olefinic linkage of oleic acid amide is saturated with ethylene diamine $(NH_2 \cdot CH_2 \cdot CH_2 \cdot NH_2)$ to form the amino acid amide of the following composition:

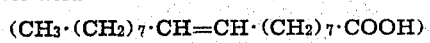

In the preparation of this compound I proceed as follows:

A known quantity of oleic acid, thoroughly dehydrated, is converted in any convenient manner into the oleic acid amide by reacting the oleic acid with ammonia $(NH_3)$. The oleic acid amide and a hydrogenating catalyst such as, for example, platinum or palladium black deposited on glass wool to obtain a relatively large surface area of the catalyst are placed in a container sealed from the atmosphere from which all air has been removed either by evacuation or by displacement and ethylene diamine in an amount in slight excess of one molar weight of amine for each molar weight of amide is added slowly thereto.

The reaction between the oleic acid amide and ethylene amine proceeds at atmospheric temperatures in the presence of platinum and palladium black. Where other hydrogenating catalysts are employed in place of platinum or palladium black, the reacting compounds must be heated in any convenient manner to the hydrogen activating temperature of the catalyst, which in some instances will require the provision of refluxing means to prevent the escape of volatile gases from the reaction zone or the use of a container such as an autoclave within which to conduct the reaction. For example, copper-chromite catalyst has a hydrogen activating temperature of about 200° C. and when this catalyst is employed in place of platinum or palladium black the temperature of reaction should be within the range 160–210° C. When nickel is employed as a hydrogen activating catalyst temperatures approximating 250° C. are employed.

Where ethylene diamine in an amount in excess of two molar weights for each molar weight of oleic acid amide present is employed each of the unsaturated carbons of the center olefinic linkage (CH=CH) will react with the ethylene diamine and the oleic acid amide will split up at the center olefinic linkage into two compounds substantially in accordance with the following equation:

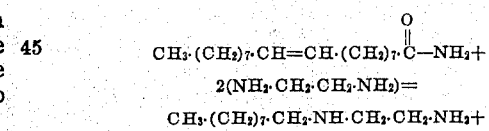

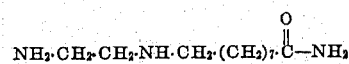

One compound is a high molecular weight amine (mono nonyl ethylene diamine) and the other compound is a high molecular weight carboxylic acid amide (alpha ethylene diamine octyl mono-carboxylic acid amide) and each compound contains one mole of ethylene diamine. These two compounds may be separated from each other by methods well known in the art.

Where the reaction between oleic acid amide and ethylene diamine is conducted at temperatures much above atmospheric temperatures the reaction tends to go directly into the formation of the split reaction products above identified. In place of the amide of the fatty acid in the above equation I may employ a metal salt of the said acid, such as the nickel salt, in which case the amount of amine excess required may be greatly reduced. In part the metal catalyst performs this function. By hydrolysis the metal constituent of the aminated products may be subsequently removed.

It is believed apparent to any one skilled in the art that the amide compound of any unsaturated fatty acid may be substituted for the oleic acid amide of the specific embodiment without departure from the present invention to form an analogous series of substituted amino compounds hereinabove described for oleic acid. It is also believed apparent that any amine conforming to the well recognized general formula $R \cdot NHR_1$ may be substituted for ethylene diamine in the above described reaction without essential departure from the present invention to form thereby substituted amino compounds of the amine substituted in place of ethylene diamine and in this case the only important limitation appears to be that the amine substituted for ethylene diamine must be an aliphatic amine containing at least one amino nitrogen group and at least one free hydrogen attached to the amino nitrogen of said group. The only limitation that appears as to the amine which may be substituted for ethylene diamino is that the amine must contain at least one activatable amino nitrogen group containing at least one displaceable amino hydrogen which is attached to an aliphatic carbon group. In the formula $R \cdot NHR_1$, $R$=an aliphatic group containing at least one carbon atom and $R_1$=hydrogen or any group substituted for said hydrogen. Accordingly, the formula may be construed to include simple amines, diamines and polyamines.

All modifications and departures of the present invention are contemplated as may fall within the scope of the following claims.

What I claim is:

1. The method of converting oleic amide into a substituted amino acid amide of a mono-carboxylic acid which comprises disposing a mixture of the fatty acid amide and a hydrogen activation catalyst in a container from which air and moisture are excluded, heating the said mixture of fatty acid amide and catalyst to the hydrogen activating temperature of the said catalyst and adding an aliphatic amine to the said heated mixture, said amine containing at least one amino nitrogen group attached directly to an aliphatic carbon group with at least one amino hydrogen attached to the amino nitrogen group, and the amount of said aliphatic amine being in excess of that amount required to provide sufficient amino hydrogens for activation by said catalyst to saturate the unsaturated carbons of the center olefinic linkage in the said fatty acid amide.

2. The method of claim 1, wherein said aliphatic amine comprises ethylene diamine.

3. The method of claim 1, wherein said hydrogen activating catalyst comprises one of the catalysts of the group consisting of platinum black, palladium black, copper-chromite, and nickel, and wherein the temperature of heating said mixture of fatty acid amide and catalyst comprises atmospheric temperatures, 200° C. and 250° C., respectively, with the three said catalysts.

4. The method of claim 1, wherein said aliphatic amine comprises ethylene diamine; said catalyst comprises copper-chromite; said temperature of heating comprises a temperature within the range 160–210° C.; and wherein the amount of said amine added approximates one molar weight for each molar weight of fatty acid amide present in said mixture.

FREDERICK C. BERSWORTH.